United States Patent
Barliga et al.

(10) Patent No.: US 7,552,045 B2
(45) Date of Patent: Jun. 23, 2009

(54) METHOD, APPARATUS AND COMPUTER PROGRAM PRODUCT FOR PROVIDING FLEXIBLE TEXT BASED LANGUAGE IDENTIFICATION

(75) Inventors: Bogdan Barliga, Tampere (FI); Mikko A. Harju, Tampere (FI); Juha Iso-Sipila, Tampere (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 11/611,964

(22) Filed: Dec. 18, 2006

(65) Prior Publication Data

US 2008/0147380 A1    Jun. 19, 2008

(51) Int. Cl.
G06F 17/20   (2006.01)
G06F 17/28   (2006.01)

(52) U.S. Cl. .................... 704/8; 704/1; 704/9
(58) Field of Classification Search .......... None
See application file for complete search history.

(56) References Cited

U.S. PATENT DOCUMENTS

| | | | |
|---|---|---|---|
| 5,062,143 A | | 10/1991 | Schmitt |
| 6,167,369 A | * | 12/2000 | Schulze ............... 704/9 |
| 6,272,456 B1 | * | 8/2001 | de Campos ........... 704/8 |
| 6,292,772 B1 | | 9/2001 | Kantrowitz |
| 6,415,250 B1 | | 7/2002 | Van den Akker |
| 2002/0184003 A1 | * | 12/2002 | Hakkinen et al. ........ 704/8 |
| 2004/0078191 A1 | | 4/2004 | Tain et al. |
| 2004/0138869 A1 | | 7/2004 | Heinecke |
| 2004/0205675 A1 | * | 10/2004 | Veerappan et al. .... 715/536 |
| 2006/0025988 A1 | * | 2/2006 | Xu et al. ............... 704/8 |
| 2006/0184357 A1 | * | 8/2006 | Ramsey et al. ......... 704/9 |
| 2006/0229865 A1 | * | 10/2006 | Carlgren et al. ....... 704/8 |
| 2007/0219777 A1 | * | 9/2007 | Chu et al. ............. 704/9 |

FOREIGN PATENT DOCUMENTS

| | | | |
|---|---|---|---|
| EP | 1 246 075 A2 | 10/2002 |
| EP | 1 612 695 A1 | 1/2006 |
| EP | 1 691 299 A2 | 8/2006 |

OTHER PUBLICATIONS

Kranig, S., *Evaluation of Language Identification Methods*, Jan. 1, 2005, available at ttp://www.sfs.uni-tuebingen.de/iscl.Theses/kranig.pdf, (Sep. 18, 2007), 24 pages.
Cavnar, W. B. et al.,*N-Gram-Based Text Categorization*, Proceedings Annual Symposium on Document Analysis & Information Retrieval, Jan. 1, 1988, 14 pages.
International Search Report for PCT/IB2007/003882 dated Sep. 11, 2008.

* cited by examiner

*Primary Examiner*—David R Hudspeth
*Assistant Examiner*—Matthew J. Sked
(74) *Attorney, Agent, or Firm*—Alston & Bird LLP

(57) ABSTRACT

An apparatus for providing flexible text based language identification includes an alphabet scoring element, an n-gram frequency element and a processing element. The alphabet scoring element may be configured to receive an entry in a computer readable text format and to calculate an alphabet score of the entry for each of a plurality of languages. The n-gram frequency element may be configured to calculate an n-gram frequency score of the entry for each of the plurality of languages. The processing element may be in communication with the n-gram frequency element and the alphabet scoring element. The processing element may also be configured to determine a language associated with the entry based on a combination of the alphabet score and the n-gram frequency score.

33 Claims, 4 Drawing Sheets

METHOD, APPARATUS AND COMPUTER PROGRAM PRODUCT FOR PROVIDING FLEXIBLE TEXT BASED LANGUAGE IDENTIFICATION

TECHNOLOGICAL FIELD

Embodiments of the present invention relate generally to speech processing technology and, more particularly, relate to a method, apparatus, and computer program product for providing flexible text based language identification.

BACKGROUND

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer.

Current and future networking technologies continue to facilitate ease of information transfer and convenience to users. One area in which there is a demand to increase ease of information transfer relates to the delivery of services to a user of a mobile terminal. The services may be in the form of a particular media or communication application desired by the user, such as a music player, a game player, an electronic book, short messages, email, etc. The services may also be in the form of interactive applications in which the user may respond to a network device in order to perform a task, play a game or achieve a goal. The services may be provided from a network server or other network device, or even from the mobile terminal such as, for example, a mobile telephone, a mobile television, a mobile computer, a mobile gaming system, etc.

In many applications, it is necessary for the user to receive audio information such as oral feedback or instructions from the network or mobile terminal or for the user to give oral instructions or feedback to the network or mobile terminal. Such applications may provide for a user interface that does not rely on substantial manual user activity. In other words, the user may interact with the application in a hands free or semi-hands free environment. An example of such an application may be paying a bill, ordering a program, requesting and receiving driving instructions, etc. Other applications may convert oral speech into text or perform some other function based on recognized speech, such as dictating SMS or email, etc. In order to support these and other applications, speech recognition applications, applications that produce speech from text, and other speech processing devices are becoming more common.

Devices that produce speech from computer readable text, such as text-to-speech (TTS) devices typically analyze text and perform phonetic and prosodic analysis to generate phonemes for output as synthetic speech relating to the content of the original text. However, since such devices are used all over the world and further since many geographic locations are becoming increasingly diverse in terms of the languages spoken by local inhabitants, texts involving various languages may be encountered. As such, a direct phoneme to synthetic speech conversion of the text may suffer from inaccuracies or fail to sound natural. Current mechanisms directed to curing the deficiencies above may require large amounts of text in order to function properly and are therefore inflexible.

Accordingly, it may be desirable to provide flexible language identification for input data to ensure that an appropriate language model is utilized in performing text to speech conversions.

BRIEF SUMMARY

A method, apparatus and computer program product are therefore provided for providing flexible text based language identification. According to exemplary embodiments of the present invention, text even as short as a single word may be accurately analyzed for language identification. Thus, flexible language identification may be provided in order to support a highly configurable multilingual system.

In one exemplary embodiment, a method of providing flexible text based language identification is provided. The method includes receiving an entry in a computer readable text format, determining an alphabet score of the entry for each of a plurality of languages, determining an n-gram frequency score of the entry for each of the plurality of languages, and determining a language associated with the entry based on a combination of the alphabet score and the n-gram frequency score.

In another exemplary embodiment, a computer program product for providing flexible text based language identification is provided. The computer program product includes at least one computer-readable storage medium having computer-readable program code portions stored therein. The computer-readable program code portions include first, second, third and fourth executable portions. The first executable portion is for receiving an entry in a computer readable text format. The second executable portion is for determining an alphabet score of the entry for each of a plurality of languages. The third executable portion is for determining an n-gram frequency score of the entry for each of the plurality of languages. The fourth executable portion is for determining a language associated with the entry based on a combination of the alphabet score and the n-gram frequency score.

In another exemplary embodiment, an apparatus for providing flexible text based language identification is provided. The apparatus may include an alphabet scoring element, an n-gram frequency element and a processing element. The alphabet scoring element may be configured to receive an entry in a computer readable text format and to calculate an alphabet score of the entry for each of a plurality of languages. The n-gram frequency element may be configured to calculate an n-gram frequency score of the entry for each of the plurality of languages. The processing element may be in communication with the n-gram frequency element and the alphabet scoring element. The processing element may also be configured to determine a language associated with the entry based on a combination of the alphabet score and the n-gram frequency score.

In another exemplary embodiment, an apparatus for providing flexible text based language identification is provided. The apparatus includes means for receiving an entry in a computer readable text format, means for determining an alphabet score of the entry for each of a plurality of languages, means for determining an n-gram frequency score of the entry for each of the plurality of and means for determining a language associated with the entry based on a combination of the alphabet score and the n-gram frequency score.

Embodiments of the invention may provide a method, apparatus and computer program product for employment in systems to enhance speech processing. As a result, for example, mobile terminals and other electronic devices may benefit from an ability to perform speech processing for numerous languages, accurately and without large amounts of text based data for analysis. Accordingly, accurate word recognition and reproduction may be performed using relatively small amounts of resources.

BRIEF DESCRIPTION OF THE SEVERAL VIEWS OF THE DRAWING(S)

Having thus described embodiments of the invention in general terms, reference will now be made to the accompanying drawings, which are not necessarily drawn to scale, and wherein:

DETAILED DESCRIPTION

Figure 1:
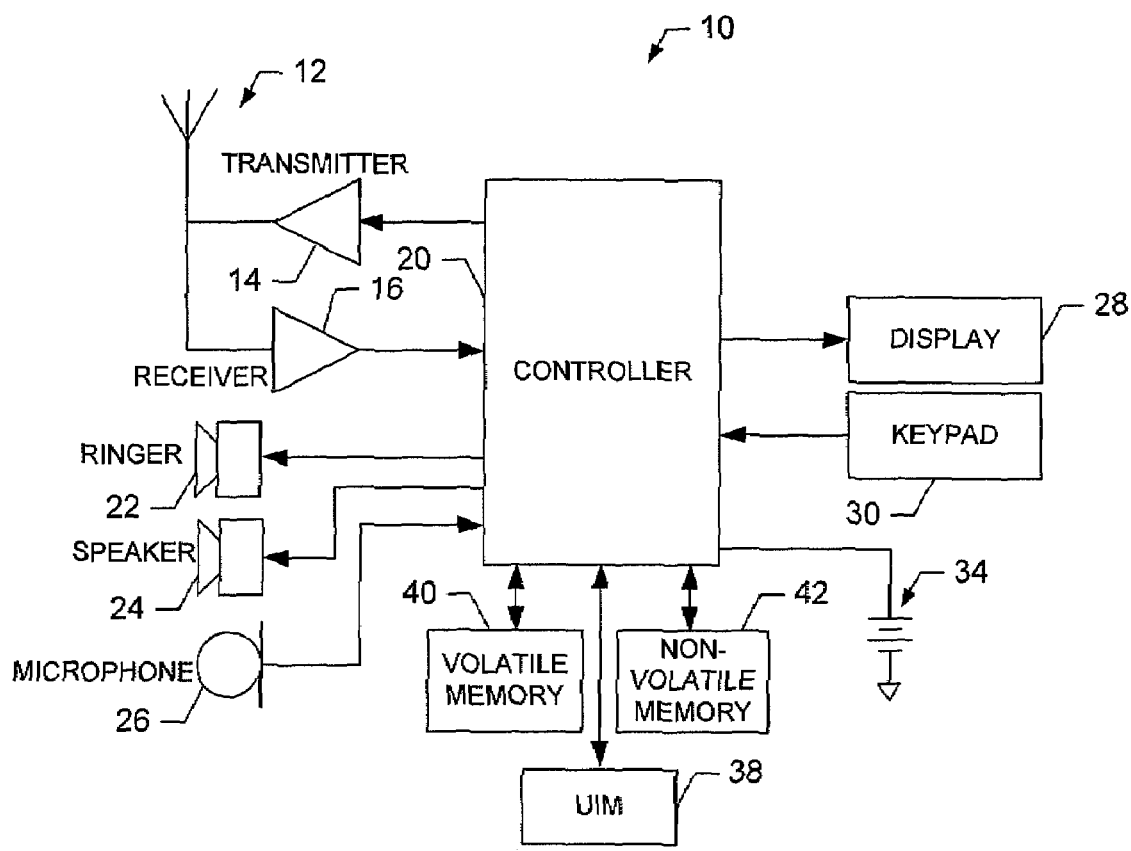
FIG. 1 is a schematic block diagram of a mobile terminal according to an exemplary embodiment of the present invention.

Embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout.

FIG. 1 illustrates a block diagram of a mobile terminal 10 that would benefit from embodiments of the present invention. It should be understood, however, that a mobile telephone as illustrated and hereinafter described is merely illustrative of one type of mobile terminal that would benefit from embodiments of the present invention and, therefore, should not be taken to limit the scope of embodiments of the present invention. While one embodiment of the mobile terminal 10 is illustrated and will be hereinafter described for purposes of example, other types of mobile terminals, such as portable digital assistants (PDAs), pagers, mobile computers, mobile televisions, gaming devices, laptop computers, cameras, video recorders, GPS devices and other types of voice and text communications systems, can readily employ embodiments of the present invention. Furthermore, devices that are not mobile may also readily employ embodiments of the present invention.

The system and method of embodiments of the present invention will be primarily described below in conjunction with mobile communications applications. However, it should be understood that the system and method of embodiments of the present invention can be utilized in conjunction with a variety of other applications, both in the mobile communications industries and outside of the mobile communications industries.

The mobile terminal 10 includes an antenna 12 (or multiple antennae) in operable communication with a transmitter 14 and a receiver 16. The mobile terminal 10 further includes a controller 20 or other processing element that provides signals to and receives signals from the transmitter 14 and receiver 16, respectively. The signals include signaling information in accordance with the air interface standard of the applicable cellular system, and also user speech, received data and/or user generated data. In this regard, the mobile terminal 10 is capable of operating with one or more air interface standards, communication protocols, modulation types, and access types. By way of illustration, the mobile terminal 10 is capable of operating in accordance with any of a number of first, second, third and/or fourth-generation communication protocols or the like. For example, the mobile terminal 10 may be capable of operating in accordance with second-generation (2G) wireless communication protocols IS-136 (TDMA), GSM, and IS-95 (CDMA), or with third-generation (3G) wireless communication protocols, such as UMTS, CDMA2000, WCDMA and TD-SCDMA, with fourth-generation (4G) wireless communication protocols or the like.

It is understood that the controller 20 includes circuitry desirable for implementing audio and logic functions of the mobile terminal 10. For example, the controller 20 may be comprised of a digital signal processor device, a microprocessor device, and various analog to digital converters, digital to analog converters, and other support circuits. Control and signal processing functions of the mobile terminal 10 are allocated between these devices according to their respective capabilities. The controller 20 thus may also include the functionality to convolutionally encode and interleave message and data prior to modulation and transmission. The controller 20 can additionally include an internal voice coder, and may include an internal data modem. Further, the controller 20 may include functionality to operate one or more software programs, which may be stored in memory. For example, the controller 20 may be capable of operating a connectivity program, such as a conventional Web browser. The connectivity program may then allow the mobile terminal 10 to transmit and receive Web content, such as location-based content and/or other web page content, according to a Wireless Application Protocol (WAP), Hypertext Transfer Protocol (HTTP) and/or the like, for example.

The mobile terminal 10 may also comprise a user interface including an output device such as a conventional earphone or speaker 24, a ringer 22, a microphone 26, a display 28, and a user input interface, all of which are coupled to the controller 20. The user input interface, which allows the mobile terminal 10 to receive data, may include any of a number of devices allowing the mobile terminal 10 to receive data, such as a keypad 30, a touch display (not shown) or other input device. In embodiments including the keypad 30, the keypad 30 may include the conventional numeric (0-9) and related keys (#, *), and other keys used for operating the mobile terminal 10. Alternatively, the keypad 30 may include a conventional QWERTY keypad arrangement. The keypad 30 may also include various soft keys with associated functions. In addition, or alternatively, the mobile terminal 10 may include an interface device such as a joystick or other user input interface. The mobile terminal 10 further includes a battery 34, such as a vibrating battery pack, for powering various circuits that are required to operate the mobile terminal 10, as well as optionally providing mechanical vibration as a detectable output.

The mobile terminal 10 may further include a user identity module (UIM) 38. The UIM 38 is typically a memory device having a processor built in. The UIM 38 may include, for example, a subscriber identity module (SIM), a universal integrated circuit card (UICC), a universal subscriber identity module (USIM), a removable user identity module (R-UIM), etc. The UIM 38 typically stores information elements related to a mobile subscriber. In addition to the UIM 38, the mobile terminal 10 may be equipped with memory. For example, the mobile terminal 10 may include volatile memory 40, such as volatile Random Access Memory (RAM) including a cache area for the temporary storage of data. The mobile terminal 10 may also include other non-volatile memory 42, which can be embedded and/or may be removable. The non-volatile memory 42 can additionally or alternatively comprise an EEPROM, flash memory or the like, such as that available from the SanDisk Corporation of Sunnyvale, Calif., or Lexar Media Inc. of Fremont, Calif. The memories can store any of a number of pieces of information, and data, used by the mobile terminal 10 to implement the functions of the mobile terminal 10. For example, the memories can include an identifier, such as an international mobile equipment identification (IMEI) code, capable of uniquely identifying the mobile terminal 10.

Figure 2:
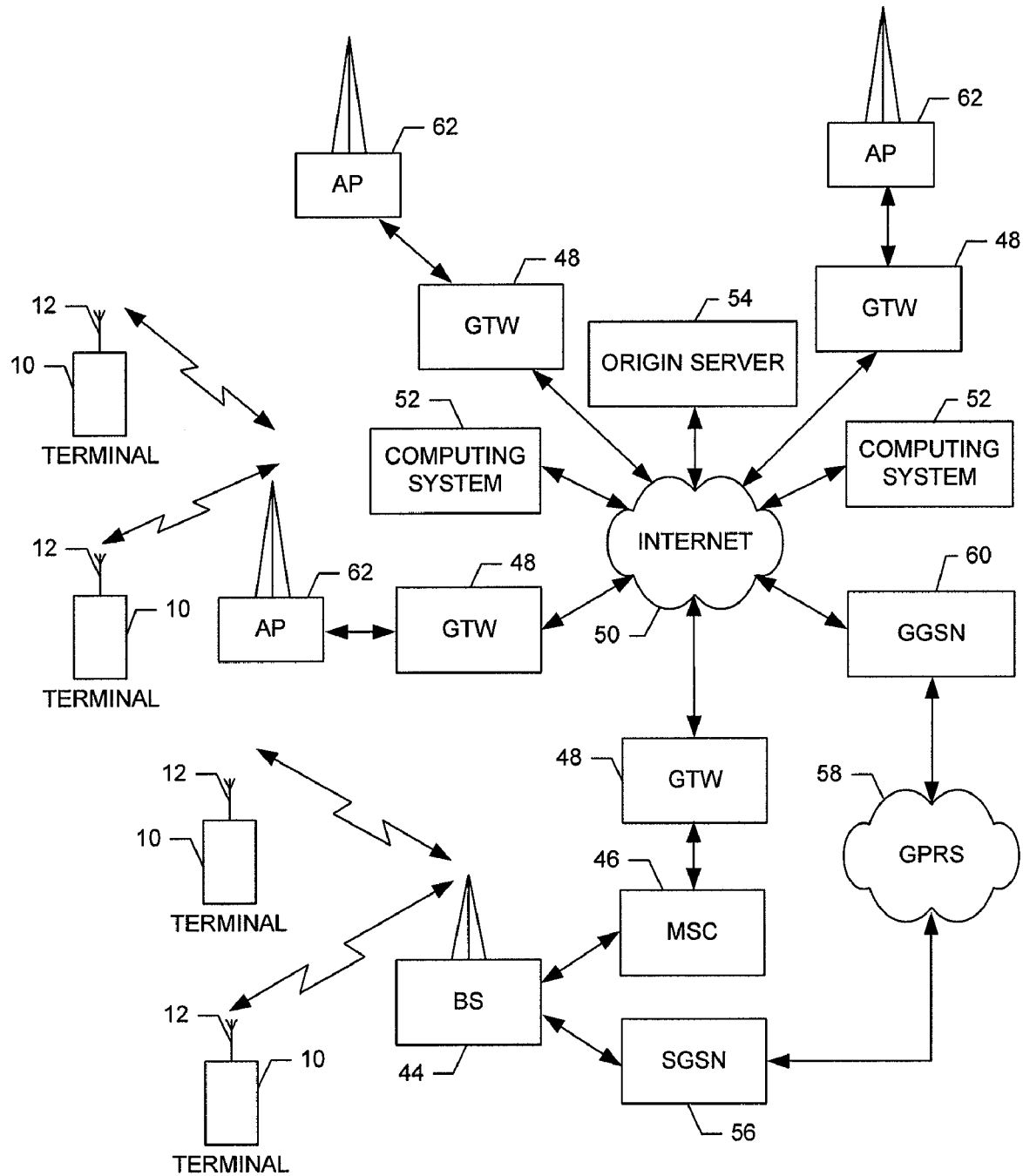
FIG. 2 is a schematic block diagram of a wireless communications system according to an exemplary embodiment of the present invention.

FIG. 2 is a schematic block diagram of a wireless communications system according to an exemplary embodiment of the present invention. Referring now to FIG. 2, an illustration of one type of system that would benefit from embodiments of the present invention is provided. The system includes a plurality of network devices. As shown, one or more mobile terminals 10 may each include an antenna 12 for transmitting signals to and for receiving signals from a base site or base station (BS) 44. The base station 44 may be a part of one or more cellular or mobile networks each of which includes elements required to operate the network, such as a mobile switching center (MSC) 46. As well known to those skilled in the art, the mobile network may also be referred to as a Base Station/MSC/Interworking function (BMI). In operation, the MSC 46 is capable of routing calls to and from the mobile terminal 10 when the mobile terminal 10 is making and receiving calls. The MSC 46 can also provide a connection to landline trunks when the mobile terminal 10 is involved in a call. In addition, the MSC 46 can be capable of controlling the forwarding of messages to and from the mobile terminal 10, and can also control the forwarding of messages for the mobile terminal 10 to and from a messaging center. It should be noted that although the MSC 46 is shown in the system of FIG. 2, the MSC 46 is merely an exemplary network device and embodiments of the present invention are not limited to use in a network employing an MSC.

The MSC 46 can be coupled to a data network, such as a local area network (LAN), a metropolitan area network (MAN), and/or a wide area network (WAN). The MSC 46 can be directly coupled to the data network. In one typical embodiment, however, the MSC 46 is coupled to a gateway device (GTW) 48, and the GTW 48 is coupled to a WAN, such as the Internet 50. In turn, devices such as processing elements (e.g., personal computers, server computers or the like) can be coupled to the mobile terminal 10 via the Internet 50. For example, as explained below, the processing elements can include one or more processing elements associated with a computing system 52 (two shown in FIG. 2), origin server 54 (one shown in FIG. 2) or the like, as described below.

The BS 44 can also be coupled to a signaling GPRS (General Packet Radio Service) support node (SGSN) 56. As known to those skilled in the art, the SGSN 56 is typically capable of performing functions similar to the MSC 46 for packet switched services. The SGSN 56, like the MSC 46, can be coupled to a data network, such as the Internet 50. The SGSN 56 can be directly coupled to the data network. In a more typical embodiment, however, the SGSN 56 is coupled to a packet-switched core network, such as a GPRS core network 58. The packet-switched core network is then coupled to another GTW 48, such as a GTW GPRS support node (GGSN) 60, and the GGSN 60 is coupled to the Internet 50. In addition to the GGSN 60, the packet-switched core network can also be coupled to a GTW 48. Also, the GGSN 60 can be coupled to a messaging center. In this regard, the GGSN 60 and the SGSN 56, like the MSC 46, may be capable of controlling the forwarding of messages, such as MMS messages. The GGSN 60 and SGSN 56 may also be capable of controlling the forwarding of messages for the mobile terminal 10 to and from the messaging center.

In addition, by coupling the SGSN 56 to the GPRS core network 58 and the GGSN 60, devices such as a computing system 52 and/or origin server 54 may be coupled to the mobile terminal 10 via the Internet 50, SGSN 56 and GGSN 60. In this regard, devices such as the computing system 52 and/or origin server 54 may communicate with the mobile terminal 10 across the SGSN 56, GPRS core network 58 and the GGSN 60. By directly or indirectly connecting mobile terminals 10 and the other devices (e.g., computing system 52, origin server 54, etc.) to the Internet 50, the mobile terminals 10 may communicate with the other devices and with one another, such as according to the Hypertext Transfer Protocol (HTTP) and/or the like, to thereby carry out various functions of the mobile terminals 10.

Although not every element of every possible mobile network is shown and described herein, it should be appreciated that the mobile terminal 10 may be coupled to one or more of any of a number of different networks through the BS 44. In this regard, the network(s) may be capable of supporting communication in accordance with any one or more of a number of first-generation (1G), second-generation (2G), 2.5G, third-generation (3G), 3.9G, fourth-generation (4G) mobile communication protocols or the like. For example, one or more of the network(s) can be capable of supporting communication in accordance with 2G wireless communication protocols IS-136 (TDMA), GSM, and IS-95 (CDMA). Also, for example, one or more of the network(s) can be capable of supporting communication in accordance with 2.5G wireless communication protocols GPRS, Enhanced Data GSM Environment (EDGE), or the like. Further, for example, one or more of the network(s) can be capable of supporting communication in accordance with 3G wireless communication protocols such as a Universal Mobile Telephone System (UMTS) network employing Wideband Code Division Multiple Access (WCDMA) radio access technology. Some narrow-band AMPS (NAMPS), as well as TACS, network(s) may also benefit from embodiments of the present invention, as should dual or higher mode mobile stations (e.g., digital/analog or TDMA/CDMA/analog phones).

The mobile terminal 10 can further be coupled to one or more wireless access points (APs) 62. The APs 62 may comprise access points configured to communicate with the mobile terminal 10 in accordance with techniques such as, for example, radio frequency (RF), Bluetooth (BT), infrared (IrDA) or any of a number of different wireless networking techniques, including wireless LAN (WLAN) techniques such as IEEE 802.11 (e.g., 802.11a, 802.11b, 802.11g, 802.11n, etc.), WiMAX techniques such as IEEE 802.16, and/or ultra wideband (UWB) techniques such as IEEE 802.15 and/or the like. The APs 62 may be coupled to the Internet 50. Like with the MSC 46, the APs 62 can be directly coupled to the Internet 50. In one embodiment, however, the APs 62 are indirectly coupled to the Internet 50 via a GTW 48. Furthermore, in one embodiment, the BS 44 may be considered as another AP 62. As will be appreciated, by directly or indirectly connecting the mobile terminals 10 and the computing system 52, the origin server 54, and/or any of a number of other devices, to the Internet 50, the mobile terminals 10 can communicate with one another, the computing system, etc., to thereby carry out various functions of the mobile terminals 10, such as to transmit data, content or the like to, and/or receive content, data or the like from, the computing system 52. As used herein, the terms "data," "content," "information" and similar terms may be used interchangeably to refer to data capable of being transmitted, received and/or stored in accordance with embodiments of the present invention. Thus, use of any such terms should not be taken to limit the spirit and scope of embodiments of the present invention.

Although not shown in FIG. 2, in addition to or in lieu of coupling the mobile terminal 10 to computing systems 52 across the Internet 50, the mobile terminal 10 and computing system 52 may be coupled to one another and communicate in accordance with, for example, RF, BT, IrDA or any of a number of different wireline or wireless communication techniques, including LAN, WLAN, WiMAX, UWB techniques and/or the like. One or more of the computing systems 52 can additionally, or alternatively, include a removable memory capable of storing content, which can thereafter be transferred to the mobile terminal 10. Further, the mobile terminal 10 can be coupled to one or more electronic devices, such as printers, digital projectors and/or other multimedia capturing, producing and/or storing devices (e.g., other terminals). Like with the computing systems 52, the mobile terminal 10 may be configured to communicate with the portable electronic devices in accordance with techniques such as, for example, RF, BT, IrDA or any of a number of different wireline or wireless communication techniques, including USB, LAN, WLAN, WiMAX, UWB techniques and/or the like.

In an exemplary embodiment, data associated with a spoken language interface may be communicated over the system of FIG. 2 between a mobile terminal, which may be similar to the mobile terminal 10 of FIG. 1 and a network device of the system of FIG. 2, or between mobile terminals. As such, it should be understood that the system of FIG. 2 need not be employed for communication between the server and the mobile terminal, but rather FIG. 2 is merely provided for purposes of example. Furthermore, it should be understood that embodiments of the present invention may be resident on a communication device such as the mobile terminal 10, or may be resident on a network device or other device accessible to the communication device.

Figure 3:
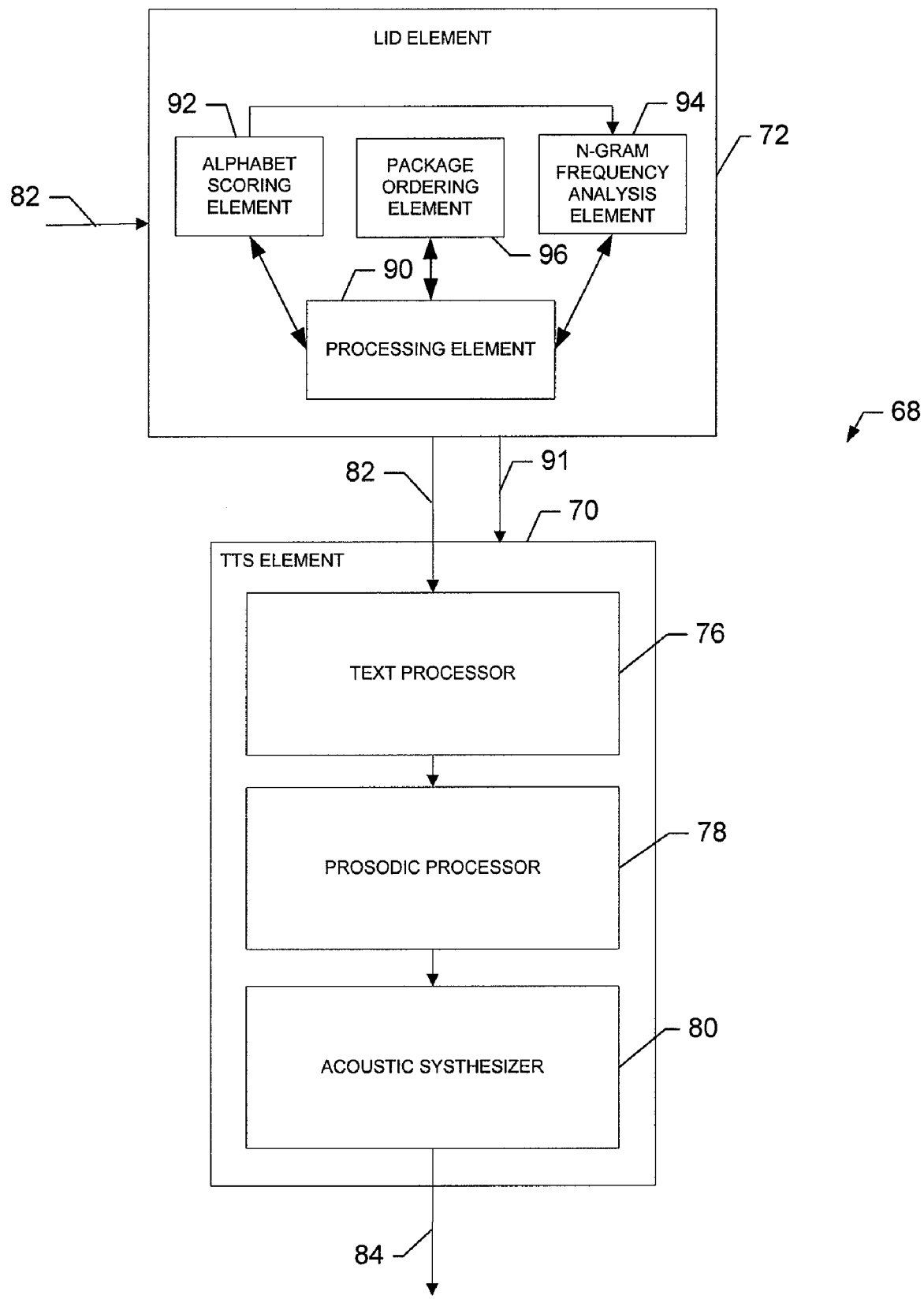
FIG. 3 illustrates a block diagram of a system for providing flexible text based language identification according to an exemplary embodiment of the present invention.

FIG. 3 illustrates a block diagram of a system for providing flexible language identification according to an exemplary embodiment of the present invention. An exemplary embodiment of the invention will now be described with reference to FIG. 3, in which certain elements of a system for providing flexible language identification are displayed. The system of FIG. 3 will be described, for purposes of example, in connection with the mobile terminal 10 of FIG. 1. However, it should be noted that the system of FIG. 3, may also be employed in connection with a variety of other devices, both mobile and fixed, and therefore, embodiments of the present invention should not be limited to application on devices such as the mobile terminal 10 of FIG. 1. It should also be noted, that while FIG. 3 illustrates one example of a configuration of a system for providing flexible language identification, numerous other configurations may also be used to implement embodiments of the present invention.

Referring now to FIG. 3, a system 68 for providing flexible language identification is provided. The system 68 includes a first type of speech processing element such as a text-to-speech (TTS) element 70 in communication with a language identification (LID) element 72. It should be noted that although FIG. 3 will be described in the context of a speech processing element comprising the TTS element 72, other speech processing elements may alternatively or additionally be employed. For example, an automatic speech recognition (ASR) element could use the LID element 72 in order to select proper rules corresponding to the correct language for converting text data into a sequence of phonemes to be used in recognition. Normally the set of rules for text-to-phoneme conversion differ from one language to another. Additionally, although the LID element 72 is shown preceding the TTS element 70, such a configuration is not necessary. Rather, the LID element 72 according to embodiments of the present invention may be disposed at any portion of the system 68 where text may be analyzed. In other words, the LID element 72 may be used in connection with a speech processing element or in connection with combinations of speech processing elements to process input data, output data, or intermediate data in a text form. Furthermore, although FIG. 3 is shown with the LID element 72 providing input text to the TTS element 70, the TTS element 70 could alternatively receive the input text from any other source.

As shown in FIG. 3, in one embodiment, the TTS element 70 may be any device or means embodied in either hardware, software, or a combination of hardware and software capable of producing synthesized speech from computer readable text. As such, elements of the TTS element 70 of FIG. 3 are merely exemplary and the descriptions provided below are given merely to explain an operation of the TTS element 70 in general terms for the sake of clarity. The TTS element 70 may include, for example, a text processor 76, a prosodic processor 78 and an acoustic synthesizer 80.

The text processor 76 may receive a media input, such as an input text 82, and begin processing the input text 82 before communicating processed text to the prosodic processor 78. The text processor 76 may be configured to perform any of numerous processing operations known in the art. The text processor 76 may include a table or other mechanism to correlate a particular text word or sequence of letters with a particular specification or rule for pronunciation. In an exemplary embodiment, the text processor 76 may be configured to convert non-written-out expressions, such as numbers and abbreviations, into a corresponding written-out word equivalent.

The prosodic processor 78 may analyze the processed text to determine specifications for how the text should be pronounced, what syllables to accent, what pitch to use, how fast to deliver the sound, etc. In an exemplary embodiment, the prosodic processor 78 may be configured to divide the text and mark segments of the text into various prosodic units, like phrases, clauses, and sentences. The prosodic processor 78 may also employ a text-to-phoneme (TTP) conversion model or map for performing phonetic transcriptions of the input text 82. The combination of phonetic transcriptions and prosody information make up a symbolic linguistic representation of phonemes which may be input into the acoustic synthesizer 80.

The acoustic synthesizer 80 may be configured to produce a synthetically created audio output in the form of computer generated speech in response to an input sequence of phonemes. The acoustic synthesizer 80 may apply stored rules or models to an input from the prosodic processor 78 to generate synthetic speech 84 that audibly reproduces the computer text in a way that conforms to the specifications determined by the prosodic processor 78. The synthetic speech 84 may then be communicated to an output device such as an audio mixer or another output device such as the speaker 22.

In an exemplary embodiment in which the TTS element 70 is desired for use in a multilingual system, numerous models, each corresponding to a different language, may be stored in association with the acoustic synthesizer 80. Accordingly, each particular language model may be trained to produce natural sounding and accurate synthetic speech in response to a sequence of phonemes corresponding to the particular language. Thus, if the TTS element 70 is informed of the correct language of the input text 82 (or the language most likely to be correct based on a reasoned analysis), the TTS element 70 may be able to select the corresponding language model and produce a natural and accurate sounding representation of the input text 82 in the form of the synthetic speech 84.

In this regard, the LID element 72 may be configured to operate to analyze the input text 82, which may be even as small in size as a single word, and produce an accurate estimate of the most likely language associated with the input text 82 (e.g., best language). The LID element 72 may be any device or means embodied in either hardware, software, or a combination of hardware and software capable of receiving the input text 82 and determining the language most likely associated with the input text 82. In an exemplary embodiment, the LID element 72 may include a processing element 90 which may control the operations of, or otherwise be in communication with other elements of the LID element 72. The processing element 90 may be embodied in many ways. For example, the processing element 90 may be embodied as a processor, a coprocessor, a controller or various other processing means or devices including integrated circuits such as, for example, an ASIC (application specific integrated circuit). After determining a list of most likely languages according to the operations described below, the LID element 70 may communicate language identification information 91 to the TTS element 70. The language identification information 91 may include an identification of the best language or a listing of the n-best languages associated with the input text 82.

In an exemplary embodiment, the other elements of the LID element 72 may include an alphabet scoring element 92 configured to assign an alphabet score for each word (or entry) in the input text 82 and an n-gram frequency analysis element 94 configured to provide an n-gram frequency score for each word in the input text 82. Alternatively, the processing element 90 or even multiple processing elements may perform all of the functions associated with the alphabet scoring element 92 and/or the n-gram frequency analysis element 94. In an exemplary embodiment, the processing element 90 may be further configured to determine a combined score for each word in which the combined score includes both the alphabet score and the n-gram frequency score for each word. In an exemplary embodiment, the processing element 90 may also be configured to determine a cumulative combined score for the input text 82 based on the combined scores of each of the words in the input text 82. Based on the cumulative combined score, the processing element 90 may be configured to determine a best language (e.g., most probable or likely language) associated with the input text 82. In one embodiment, a particular language having the lowest score may represent the best language. However, alternative embodiments could select a language having a highest score, dependent upon algorithms used for score calculations and the scoring paradigm employed.

In one embodiment, the LID element 72 may include a package ordering element 96 having predefined language preference information for best language determination for use in a case where the combined score and/or the cumulative combined score do not provide a clear result with regard to determining the best language. It should be noted that the cumulative combined score could be determined either by combining each of the combined scores, or by first combining all the alphabet scores of each word in the input text 82 and combining the resultant combined alphabet scores with a result of combining all the n-gram frequency scores of each word in the input text 82.

The alphabet scoring element 92 may be configured to provide an alphabet score for each word of the input text 82 for each one of a plurality of languages. The alphabet scoring element 92 may be any device or means embodied in either hardware, software, or a combination of hardware and software capable of examining each character (or letter) of a word to be decoded and comparing each character of the word to each alphabet of the plurality of languages. Based on the comparison, the alphabet scoring element 92 may be configured to generate an alphabet score for the word in each of the plurality of languages. The alphabet score for each of the plurality of languages may be based at least in part on a failure of one or more of the characters of the word to be represented in the corresponding alphabet of a respective one of the plurality of languages being scored. In other words, if every character of a word is capable of representation in a particular language, the alphabet score for the word in the particular language may be a best possible score (which could be a high or low numerical value dependent upon the scoring paradigm selected), while the alphabet score for another language in which some of the characters are not capable of representation would be worse than the best possible score by an amount determined by the number of characters that are not capable of representation in the other language.

In an exemplary embodiment, the alphabet scoring element 92 may be configured to assign the alphabet score for each word based on the number of "out-of-alphabet" characters of the word. After calculating or otherwise determining the alphabet score for each word, the alphabet scoring element 92 may compare the alphabet score to a threshold to determine whether the word has a passing or a failing alphabet score. In an exemplary embodiment, the threshold may be a predetermined value which, if not met, represents a high likelihood that the word is not associated with a language for which the alphabet score was calculated. In other words, the failing alphabet score indicates that the word is not capable of representation in the language for which the failing alphabet score was calculated. Alternatively, a failing alphabet score may simply be assigned to a word for which none of the characters are capable of representation in the language for which the alphabet score was calculated.

After calculation of an alphabet score for the word in each of the plurality of languages, the alphabet scoring element 92 of one exemplary embodiment of the present invention removes each language having a failing alphabet score as candidate languages for further processing by the n-gram frequency element 94. In other words, if the word receives a failing alphabet score for a particular language, the word may not receive an n-gram frequency score for the particular language. In an alternative exemplary embodiment, rather than simply not calculating an n-gram frequency score for the word in a language in which the word receives a failing alphabet score, the alphabet scoring element 92 may be configured to assign a bad (e.g., lower than the lowest non-failing alphabet score) or even a worst possible score to the word. The n-gram frequency element 94 may then process the word in the language for which the word received the failing alphabet score.

In an exemplary embodiment, the alphabet scoring element 92 may be further configured to calculate or otherwise determine a cumulative alphabet score for each of the plurality of languages. The cumulative alphabet score may represent a combination of the alphabet scores of each word of the input text 82 in a corresponding one of the plurality of languages.

The cumulative alphabet score may also be compared to a threshold and processed as described above with respect to a single word.

The n-gram frequency element 94 may be configured to provide an n-gram frequency score for each word of the input text 82 for each one of the plurality of languages. The n-gram frequency element 94 may be any device or means embodied in either hardware, software, or a combination of hardware and software capable of examining each character (or letter) of a word and a probability associated with the likelihood of the word corresponding to each one of the plurality of languages based on known information about each of the plurality of languages. In this regard, a model may be utilized for each of the plurality of languages. Each model may include accumulated n-gram statistics which may represent a conditional probability of the nth character of each word (or entry) given the preceding n-1 characters. For example, for a trigram "abc", an n-gram probability may represent the conditional probability of the letter "c" given that the previous two letters are "ab". In an exemplary embodiment, the n-gram frequency score may represent an accumulation of the log of the n-gram probabilities of the n-grams associated with the word. It should also be noted that although the descriptions herein have been provided based on a word level analysis, the analysis may alternatively be performed for any text based entry on a syllable, phrase, sentence, etc., level. Alternatively, the n-gram frequency element 94 may be configured to determine a cumulative n-gram frequency score by combining the n-gram frequency scores of each word (or syllable, phrase, sentence, etc.) of the input text 82.

In an exemplary embodiment, each model may be created by gathering statistics for each of the plurality of languages. There may be no limit to a number of the plurality of languages. As such, a selection of which languages make up the plurality of languages may be made based on any desirable factors. Each model corresponds to one of the plurality of languages and is generated based on training data gathered for the language associated with each model. Each model may be embodied as a file including n-gram frequencies and/or corresponding n-gram probabilities for the language associated with the corresponding model. In an exemplary embodiment, each word of the training data may be assigned start and stop characters. In this regard, a start character (e.g., [) may precede each word and a stop character (e.g., ]) may follow each word so that start n-grams (e.g., n-grams immediately following the start character), stop n-grams (e.g., n-grams immediately preceding the stop character) and internal n-grams (e.g., grams not immediately proximate to either the start or the stop character) may be distinguished.

In an exemplary embodiment, an alphabet of a language may be described as a list of characters or letters, as a Unicode range that the alphabet occupies, or both. Accordingly, large alphabets (e.g., Mandarin), may be described along with other alphabets in a compact machine readable format. According to one embodiment, each model may be comprised of alphabet description information which assigns a unique index to each letter of the alphabet. N-gram frequency data may be expressed in terms of the indexes. The n-gram frequency data may thus be expressed in a concise way in order to reduce the file size of the model.

Utilizing each of the model files corresponding to the plurality of languages, a package associated with the LID element 72 may be created by combining the model files into a single binary file. The package may therefore define supported languages based upon which models are included in the single binary file (i.e., the models of the binary file correspond to which particular languages are supported). In one exemplary embodiment, in order to reduce the size of the binary file, n-gram frequency data may be stored in a tree structure. The tree structure may enable quick tree parsing since nodes are stored sequentially in a breadth-first traversing order.

The package ordering element 96 may be configured to perform a best language determination in a case where the combined score and/or the cumulative combined score do not provide a clear result with regard to determining the best language. The package ordering element 96 may be any device or means embodied in either hardware, software, or a combination of hardware and software capable of having predefined language preference information for breaking ties between languages in best language determination. In this regard, the package, as described above, may define supported languages. The package ordering element 96 may therefore store the package and/or store information related to a preference or ordering of the languages supported by the package. In this regard, the preference information may be determined based on geographical information (e.g., languages commonly encountered in a particular geographical location) or any other suitable information. Since the package ordering element 96 may in some cases only be utilized in situations in which a word or the input text 82 has failed alphabet scoring and is not capable of producing an n-gram frequency score, information regarding languages likely to produce such results, and the frequency of encountering such languages may be utilized in determining the preference information.

During operation, when an entry (e.g. syllable, word, phrase, sentence, etc.) is analyzed, the entry may be alphabet scored at the alphabet scoring element 92. In this regard, in one embodiment, the entry may be converted to an array of indexes of the alphabet for a current language. If the entry is not supported in the language, the language fails alphabet scoring for the entry. Meanwhile, for entries having at least some characters which correlate to characters of the language, an alphabet score is assigned for the language. The process is completed for each language and an alphabet score for each language is assigned. Failing languages may either be given a score lower than the lowest passing score, or may be eliminated as candidates as described above. The n-gram frequency element 94 may then calculate an n-gram frequency score for the entry. The entry may have start and stop character indexes added to the front and back, respectively.

Embodiments of the present invention may be employed in numerous ways. For example, embodiments may be utilized to generate an ordered list of several candidate languages for a given word, name, or entry. Accordingly, embodiments of the present invention may be helpful for use in speech recognition when no accurate information on the correct language is available (e.g., speaker independent name dialing). Embodiments may also be useful for TTS synthesis in cases where a script mismatch is observed between target TTS language and the language of a given word (e.g., synthesis of a Chinese word into English). As such, language support may be provided for a wide range of language combinations or conversions.

Figure 4:
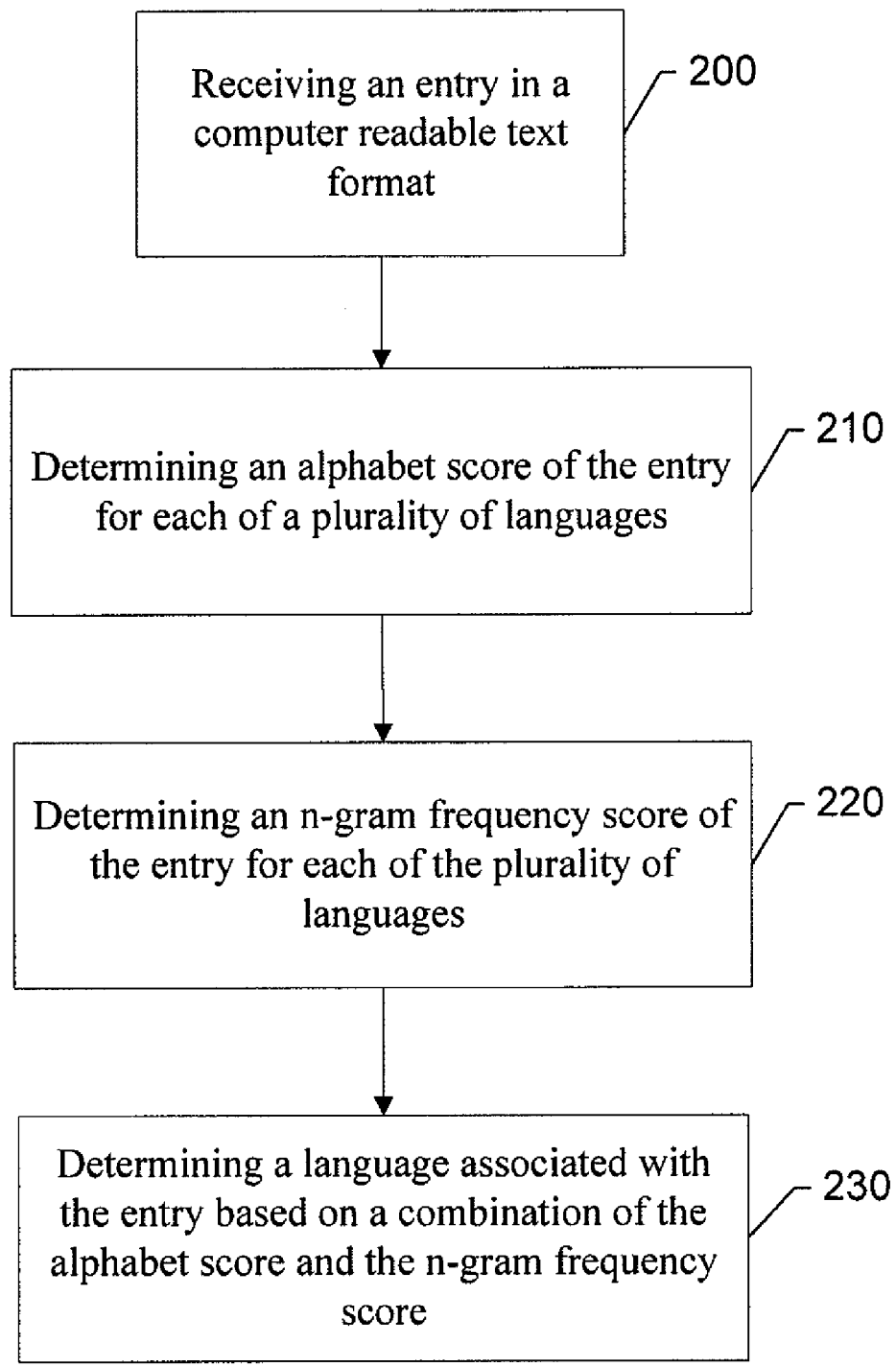
FIG. 4 is a flowchart according to an exemplary method for providing flexible text based language identification according to an exemplary embodiment of the present invention.

FIG. 4 is a flowchart of a system, method and program product according to exemplary embodiments of the invention. It will be understood that each block or step of the flowcharts, and combinations of blocks in the flowcharts, can be implemented by various means, such as hardware, firmware, and/or software including one or more computer program instructions. For example, one or more of the procedures described above may be embodied by computer program instructions. In this regard, the computer program instructions which embody the procedures described above may be stored by a memory device of a mobile terminal and executed by a built-in processor in a mobile terminal. As will be appreciated, any such computer program instructions may be loaded onto a computer or other programmable apparatus (i.e., hardware) to produce a machine, such that the instructions which execute on the computer or other programmable apparatus create means for implementing the functions specified in the flowcharts block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the flowcharts block(s) or step(s). The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the flowcharts block(s) or step(s).

Accordingly, blocks or steps of the flowcharts support combinations of means for performing the specified functions, combinations of steps for performing the specified functions and program instruction means for performing the specified functions. It will also be understood that one or more blocks or steps of the flowcharts, and combinations of blocks or steps in the flowcharts, can be implemented by special purpose hardware-based computer systems which perform the specified functions or steps, or combinations of special purpose hardware and computer instructions.

In this regard, one embodiment of a method of providing flexible text based language identification may include receiving an entry in a computer readable text format at operation 200. An alphabet score of the entry may be calculated or otherwise determined for each of a plurality of languages at operation 210. At operation 220, an n-gram frequency score of the entry may be calculated or otherwise determined for each of the plurality of languages. The method may also include determining a language associated with the entry based on a combination of the alphabet score and the n-gram frequency score at operation 230.

The above described functions may be carried out in many ways. For example, any suitable means for carrying out each of the functions described above may be employed to carry out embodiments of the invention. In one embodiment, all or a portion of the elements of the invention generally operate under control of a computer program product. The computer program product for performing the methods of embodiments of the invention includes a computer-readable storage medium, such as the non-volatile storage medium, and computer-readable program code portions, such as a series of computer instructions, embodied in the computer-readable storage medium.

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method comprising:

receiving an entry in a computer readable text format;

determining an alphabet score of the entry for each of a plurality of languages;

determining an n-gram frequency score of the entry for each of the plurality of languages; and determining, via a processor, a language associated with the entry based on a composite score comprising a combination of the alphabet score and the n-gram frequency score.

2. A method according to claim 1, wherein determining the alphabet score comprises comparing characters associated with the entry to an alphabet of each of the plurality of languages and generating a score for each of the plurality of languages, the score for each of the plurality of languages being based at least in part on a failure of one or more of the characters to be represented in the corresponding alphabet of a respective one of the plurality of languages being scored.

3. A method according to claim 1, wherein determining the n-gram frequency score comprises, for each one of the plurality of languages, comparing the entry to n-gram statistics for the one of the plurality of languages.

4. A method according to claim 3, wherein the entry comprises n-characters and wherein comparing the entry to n-gram statistics comprises determining a conditional probability of the nth character of the entry given the preceding n-1 characters.

5. A method according to claim 3, further comprising assigning a start character and a stop character to a first character and a last character of the entry, respectively, for use in correlation with corresponding start characters and stop characters associated with each n-gram probability of the n-gram statistics.

6. A method according to claim 1, further comprising comparing the alphabet score for each of the plurality of languages to a threshold.

7. A method according to claim 6, wherein determining the n-gram frequency score is only performed for ones of the plurality of languages for which the alphabet score meets the threshold.

8. A method according to claim 6, further comprising assigning the entry a predetermined alphabet score in response to the alphabet score failing to meet the threshold.

9. A method according to claim 1, wherein determining the language associated with the entry comprises selecting the language associated with the entry based on a predefined order of languages in response to the combination of the alphabet score and the n-gram frequency score providing an indeterminate result with respect to the language associated with the entry.

10. A method according to claim 1, wherein the entry is one of a plurality of segments comprising an input text and wherein the determining the language further comprises determining the language associated with the input text based on a cumulative combination of alphabet scores and n-gram frequency scores of each one of the plurality of segments.

11. A computer program product comprising at least one computer-readable storage medium having computer-readable program code portions stored therein, the computer-readable program code portions comprising:

a first executable portion for receiving an entry in a computer readable text format;

a second executable portion for determining an alphabet score of the entry for each of a plurality of languages;

a third executable portion for determining an n-gram frequency score of the entry for each of the plurality of languages; and a fourth executable portion for determining a language associated with the entry based on a composite score comprising a combination of the alphabet score and the n-gram frequency score.

12. A computer program product according to claim 11, wherein the second executable portion includes instructions for comparing characters associated with the entry to an alphabet of each of the plurality of languages and generating a score for each of the plurality of languages, the score for each of the plurality of languages being based at least in part on a failure of one or more of the characters to be represented in the corresponding alphabet of a respective one of the plurality of languages being scored.

13. A computer program product according to claim 11, wherein the third executable portion includes instructions for comparing the entry to n-gram statistics for the one of the plurality of languages for each one of the plurality of languages.

14. A computer program product according to claim 13, wherein the entry comprises n-characters and wherein the third executable portion further includes instructions for determining a conditional probability of the nth character of the entry given the preceding n-1 characters.

15. A computer program product according to claim 13, further comprising a fifth executable portion for assigning a start character and a stop character to a first character and a last character of the entry, respectively, for use in correlation with corresponding start characters and stop characters associated with each n-gram probability of the n-gram statistics.

16. A computer program product according to claim 11, further comprising a fifth executable portion for comparing the alphabet score for each of the plurality of languages to a threshold.

17. A computer program product according to claim 16, wherein the third executable portion is only executed for ones of the plurality of languages for which the alphabet score meets the threshold.

18. A computer program product according to claim 16, further comprising a sixth executable portion for assigning the entry a predetermined alphabet score in response to the alphabet score failing to meet the threshold.

19. A computer program product according to claim 11, wherein the fourth executable portion includes instructions for selecting the language associated with the entry based on a predefined order of languages in response to the combination of the alphabet score and the n-gram frequency score providing an indeterminate result with respect to the language associated with the entry.

20. A computer program product according to claim 11, wherein the entry is one of a plurality of segments comprising an input text and wherein the fourth executable portion includes instructions for determining the language associated with the input text based on a cumulative combination of alphabet scores and n-gram frequency scores of each one of the plurality of segments.

21. An apparatus comprising a processor configured to:
receive an entry in a computer readable text format and calculate an alphabet score of the entry for each of a plurality of languages;
calculate an n-gram frequency score of the entry for each of the plurality of languages; and
determine a language associated with the entry based on a composite score comprising a combination of the alphabet score and the n-gram frequency score.

22. An apparatus according to claim 21, wherein the processor is further configured to compare characters associated with the entry to an alphabet of each of the plurality of languages and generate a score for each of the plurality of languages, the score for each of the plurality of languages being based at least in part on a failure of one or more of the characters to be represented in the corresponding alphabet of a respective one of the plurality of languages being scored.

23. An apparatus according to claim 21, wherein the processor is further configured to, for each one of the plurality of languages, compare the entry to n-gram statistics for the one of the plurality of languages.

24. An apparatus according to claim 23, wherein the entry comprises n-characters and wherein the processor is further configured to determine a conditional probability of the nth character of the entry given the preceding n-1 characters.

25. An apparatus according to claim 23, wherein the processor is further configured to assign a start character and a stop character to a first character and a last character of the entry, respectively, for use in correlation with corresponding start characters and stop characters associated with each n-gram probability of the n-gram statistics.

26. An apparatus according to claim 21, the processor is further configured to compare the alphabet score for each of the plurality of languages to a threshold.

27. An apparatus according to claim 26, wherein the processor is further configured to calculate the n-gram frequency score only for ones of the plurality of languages for which the alphabet score meets the threshold.

28. An apparatus according to claim 26, wherein the processor is further configured to assign the entry a predetermined alphabet score in response to the alphabet score failing to meet the threshold.

29. An apparatus according to claim 21, further comprising a package ordering element configured to select the language associated with the entry based on a predefined order of languages in response to the combination of the alphabet score and the n-gram frequency score providing an indeterminate result with respect to the language associated with the entry.

30. An apparatus according to claim 21, wherein the entry is one of a plurality of segments comprising an input text and wherein the processor is further configured to determine the language associated with the input text based on a cumulative combination of alphabet scores and n-gram frequency scores of each one of the plurality of segments.

31. An apparatus according to claim 21, wherein the apparatus is embodied as a mobile terminal.

32. An apparatus comprising:
means for receiving an entry in a computer readable text format;
means for determining an alphabet score of the entry for each of a plurality of languages;
means for determining an n-gram frequency score of the entry for each of the plurality of languages; and
means for determining a language associated with the entry based on a composite score comprising a combination of the alphabet score and the n-gram frequency score.

33. An apparatus according to claim 32, further comprising means for selecting the language associated with the entry based on a predefined order of languages in response to the combination of the alphabet score and the n-gram frequency score providing an indeterminate result with respect to the language associated with the entry.

* * * * *